April 27, 1943.  C. HOLLERITH  2,317,610
AIRPLANE WHEEL CONSTRUCTION
Filed Feb. 14, 1940  2 Sheets-Sheet 1

Inventor
CHARLES HOLLERITH
By Beaman & Langford
Attorneys

April 27, 1943.  C. HOLLERITH  2,317,610

AIRPLANE WHEEL CONSTRUCTION

Filed Feb. 14, 1940  2 Sheets-Sheet 2

Inventor
CHARLES HOLLERITH
By Beaman & Langford
Attorneys

Patented Apr. 27, 1943

2,317,610

UNITED STATES PATENT OFFICE 2,317,610

AIRPLANE WHEEL CONSTRUCTION

Charles Hollerith, Jackson, Mich., assignor to Hayes Industries, Inc., Jackson, Mich., a corporation of Michigan Application February 14, 1940, Serial No. 318,816

4 Claims. (Cl. 152—406)

The present invention relates to improvements in airplane wheel construction.

One of the objects of the invention is to provide an airplane wheel of the type having a removable tire retaining flange in which the ratio of maximum outside and inside widths of the wheel rim has been reduced over prior practice without sacrifice of wheel strength.

Another object resides in the design of an airplane wheel having a removable rim for mounting and demounting the tire which will meet the specification of a drop center wheel.

Another object resides in providing an airplane wheel having an improved removable tire retaining flange and associated securing structure.

A further object resides in the provision of improved streamlining wheel construction in large size wheels for heavy airplanes having single and double dual brakes.

Other objects and advantages reside in the specific construction, arrangement and combination of parts for carrying out the more general objects heretofore stated, as will appear from the following specification and annexed claims.

In the drawings, wherein a single embodiment of the invention is shown.

Fig. 5 is a fragmentary cross-sectional view of the wheel rim taken on lines V—V of Fig. 2.

Figure 1:
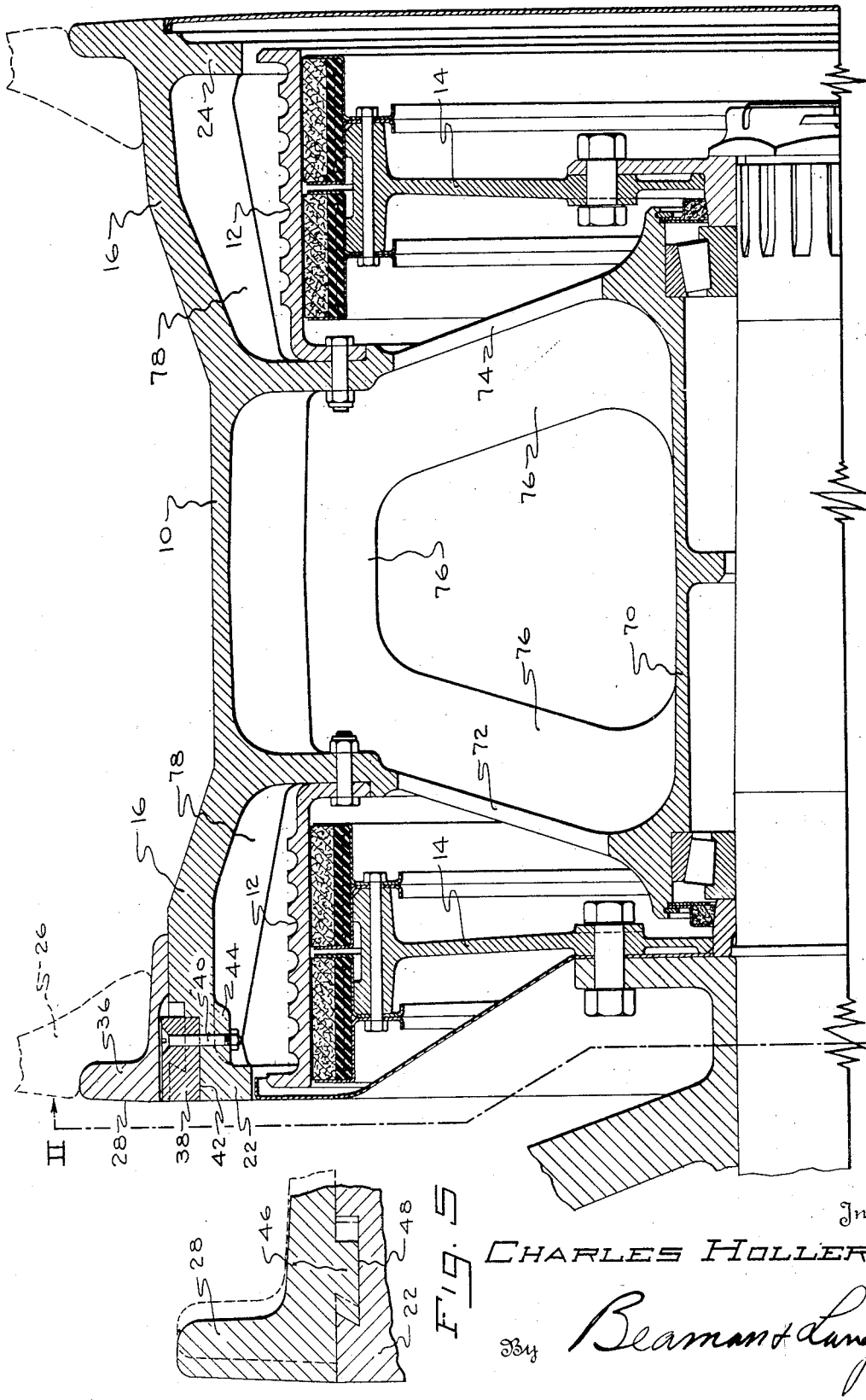
Fig. 1 is a cross-sectional view taken on lines I—I of Fig. 2.
Figure 2:
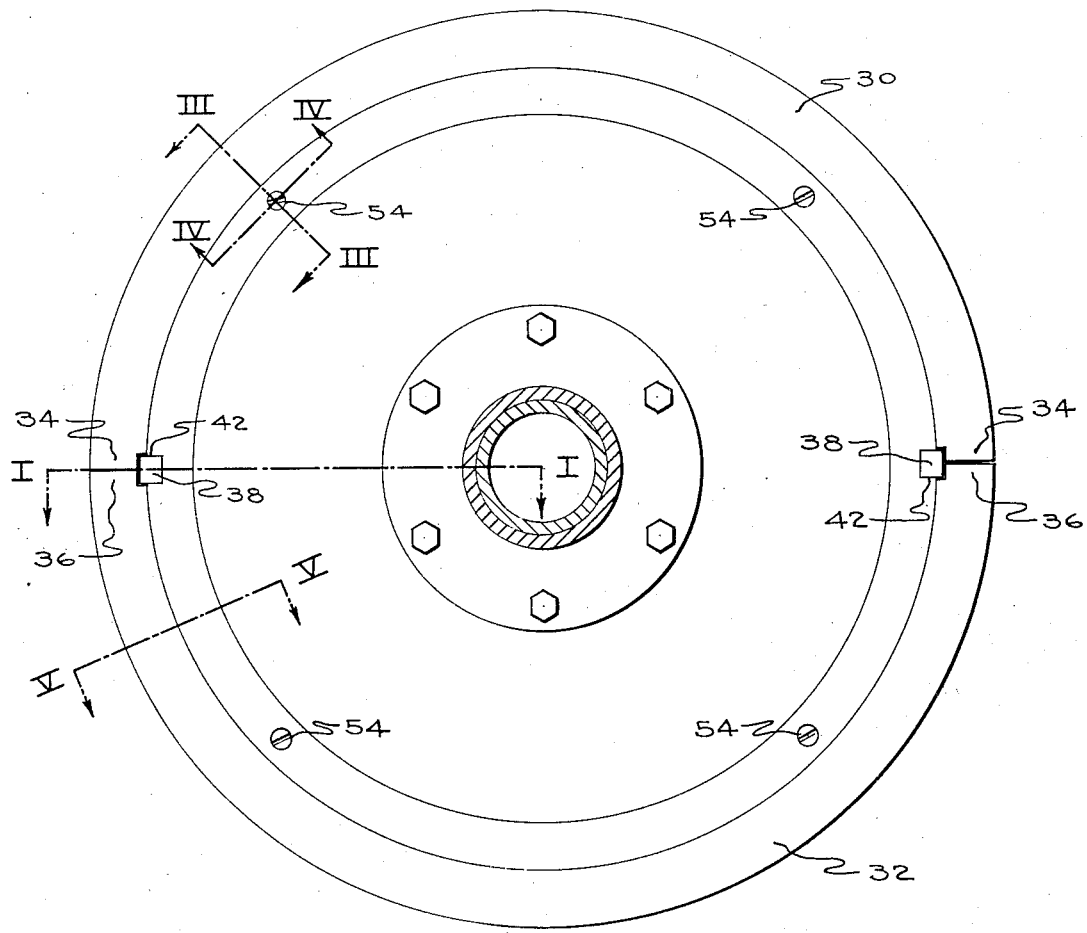
Fig. 2 is a side elevation view of the wheel in Fig. 1 as viewed from the left, with the torque flange and axle shown in section, taken along the lines II—II.

Referring to the drawings, a cast wheel 10 is shown of a type fabricated for light weight alloys and designed for airplane service. The separately fabricated brake drums 12 co-act with the dual brakes generally designed by reference characters 14. To obtain complete streamlining, it is necessary that the drums 12 and brakes 14 be confined within the wheel 10. This necessitates rim portions having substantial overhang relative to the radial supporting action of the central wheel portions. To strengthen this part of the wheel construction, inwardly depending integrally cast flanges 22 and 24 are provided to provide outer rim parts of substantial radial depth.

In order to mount and demount the tire 26 shown in dotted outline in Fig. 1, it is the practice in airplane wheels to provide a removable tire retaining rim flange which is held against outward axial movement by a suitable locking ring. According to the present invention, the removable flange and locking structure have been so designed as to avoid any necessity of supporting the outside of the rim flange inwardly of any portion of the wheel. This enables the center line of the wheel to be mounted closer to the landing gear as less clearance is required. The streamlining of the wheel is also improved.

As illustrated in my preferred arrangement, the removable rim 28 is in two semi-circular portions 30 and 32 with the end portions 34 and 36 in opposed relation. Drive pins 38 are held in position by bolts 40 and partly housed in grooves 42 in bosses 44. The ends 34 and 36 are shaped to act against the pins 38 which function to prevent rotation of the two part rim 28 relatively to the wheel.

Figure 3:
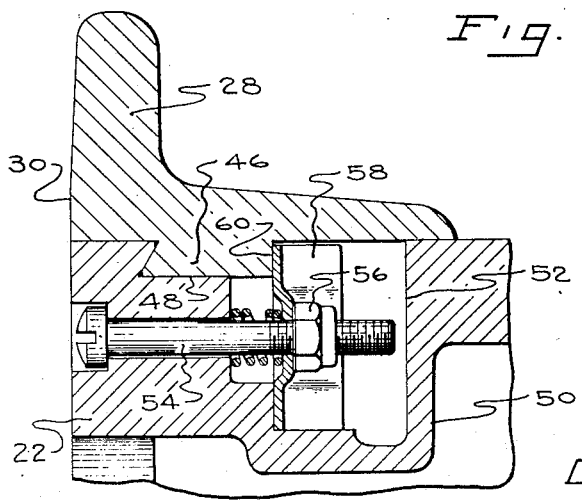
Fig. 3 is a cross-sectional view taken on the lines III—III of Fig. 2 of the structure for retaining the removable tire flange on the wheel.
Figure 4:
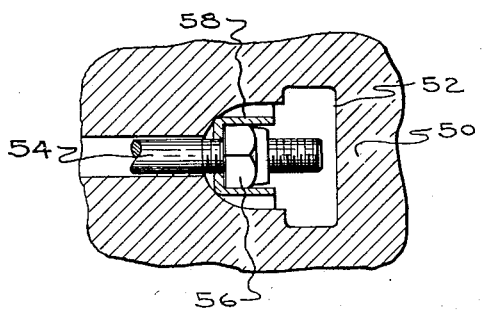
Fig. 4 is a partial cross-sectional view of the structure of Fig. 3 taken on lines IV—IV of Fig. 2.

As more clearly shown in Figs. 3, 4, and 5, the rim 28 has a semi-dove tail portion 46 which loosely fits into a similarly shaped but larger groove 48. With the tire 26 deflated, the rim part may be moved to the dotted line portion of Fig. 5 and then lifted radially out of the groove 48. To prevent the possibility of the rim portions 30 and 32 becoming dislodged in the event of under-inflation or blow-out of the tire 26, the clamp arrangement shown in Figs. 3 and 4 is provided. At 90° around the wheel 10, bosses 50 are provided in which chambers 52 are cast. Bolts 54 having a screw driver head are threaded into nuts 56 which may be of a friction lock type, held against turning in elongated sheet metal channel clamp members 58. When the bolts 54 are turned in one direction the clamp members 58 engage with the shoulders 60 to hold rim 28 in the position shown in Fig. 3 interlocked with the dove tail of the groove 48. Rotation of the bolts 54 in the opposite direction will loosen the members 58 and enable the rim portions 30 and 32 to be moved to the right as viewed in Fig. 3, a sufficient distance with the tire deflated to clear the interlocking between the dove tailed portions, whereby the rim portions 30 and 32 may be removed and the tire 26 demounted.

As should be apparent from inspection of the drawings, the hub 70 of the cast wheel is relatively wide with integral spoke portions 72 and 74 converging toward the center of the rim body. Integral radial ribs 76 circumferentially spaced reinforce the central structure while similarly spaced ribs 78 reinforce the overhanging rim portions. This construction provides wells in which the brake drum 12 and brakes 14 are entirely confined to fully streamline the wheel. The design is such that in practice brakes approximately one-third the width of the wheel rim may be used and entirely housed within the wheel, yet meet rigid strength specifications.

Having described my invention, what I desire to protect by Letters Patent and claim is:

1. A streamline airplane wheel for pneumatic tires comprising a rim having a fixed flange and removable flange spaced to receive the side walls of a tire, said removable flange being in the form of a sectional ring, a circumferential groove in said rim adjacent one edge defined in part by an angular shoulder, integral tongue portions on said ring of less width than said groove and having complementary angular shoulder portions, and clamping means carried in said rim and extending to the outer side of the wheel selectively engageable with said sectional ring to hold said complementary angular shoulder portions in interlocking relation.

2. A streamline airplane wheel for pneumatic tires comprising a rim body having an outer radial face portion, a tire retaining flange supported upon said rim body and having an outer radial face portion substantially flush with the radial face portion of said rim body, said flanges being sectional in construction and removable from the rim body to facilitate mounting of the tire, engaging shoulder portions on said sectional flange and rim body spaced inwardly from the outer sides thereof, and clamping means in said rim body and extending through the outer radial face thereof for clamping said shoulder portions together to prevent said sectional flange from being dislodged.

3. In a wheel for pneumatic tires, a rim body, a circumferential groove in said rim body, a removable tire retaining flange in the form of a pair of semi-circular portions of angular cross-section to provide an upstanding portion against which the side wall of the tire adjacent the bead engages and an inwardly extending portion upon which a bead of the tire rests, a circumferential tongue upon the inside of said flange loosely fitted in said groove, said groove and tongue on the outer side having interlocking portions with said tongue located in said groove and urged to the outer side thereof, circumferentially spaced openings in said rim body beneath said groove and extending to the outer side of the rim body, clamping members located in said openings and having portions engageable with said tongue when positioned in said groove to move the same toward the outer side of said groove to interlock the tongue in the groove, said member including means operable from the outer side of the rim body for actuating said member in one direction to clamp said flange to the rim body and in an opposite direction to enable said flange portion to be moved inwardly in the groove with the tire deflated and then radially outward to clear said interlocking portions.

4. In a wheel for pneumatic tires, a rim body, a circumferential groove in said rim body, a removable tire side wall retaining flange of angular cross-section to provide an upstanding portion and an inwardly extending tire bead supporting portion, a circumferential tongue upon the inside of said flange loosely fitted in said groove, said groove and tongue on the outer side having interlocking portions with said tongue located in said groove and urged to the outer side thereof, circumferentially spaced openings in said rim body beneath said groove and extending to the outer side of the rim body, clamping members located in said openings and having portions engageable with said tongue when positioned in said groove to move the same toward the outer side of said groove to interlock the tongue in the groove, said member including means operable from the outer side of the rim body for actuating said member in one direction to clamp said flange to the rim body and in an opposite direction to enable said flange portion to be moved inwardly in the groove with the tire deflated and then radially outward to clear said interlocking portions.

CHARLES HOLLERITH.